United States Patent
Omura

(10) Patent No.: US 11,922,953 B2
(45) Date of Patent: Mar. 5, 2024

(54) VOICE RECOGNITION DEVICE, CONTROL METHOD OF VOICE RECOGNITION DEVICE, CONTENT REPRODUCING DEVICE, AND CONTENT TRANSMISSION/RECEPTION SYSTEM

(71) Applicants: Nissan Motor Co., Ltd., Kanagawa (JP); RENAULT S.A.S., Boulogne-Billancourt (FR)

(72) Inventor: Hideo Omura, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 389 days.

(21) Appl. No.: 17/414,194

(22) PCT Filed: Dec. 18, 2018

(86) PCT No.: PCT/IB2018/001565
§ 371 (c)(1),
(2) Date: Jun. 15, 2021

(87) PCT Pub. No.: WO2020/128552
PCT Pub. Date: Jun. 25, 2020

(65) Prior Publication Data
US 2022/0044691 A1    Feb. 10, 2022

(51) Int. Cl.
*G10L 17/26* (2013.01)
*G10L 25/69* (2013.01)
(Continued)

(52) U.S. Cl.
CPC .............. *G10L 17/26* (2013.01); *G10L 25/69* (2013.01); *G10L 25/81* (2013.01); *G10L 25/84* (2013.01); *G10L 2015/223* (2013.01); *G10L 25/93* (2013.01)

(58) Field of Classification Search
None
See application file for complete search history.

(56) References Cited

U.S. PATENT DOCUMENTS 3,180,936 A  *  4/1965  Schroeder ............... H04M 1/74
                                                      324/76.35
6,338,036 B1 *  1/2002  Miyazawa .............. G10L 15/22
                                                      704/E15.04

(Continued)

FOREIGN PATENT DOCUMENTS

JP    H03-160499 A    7/1991
JP    H07-023400 U    4/1995

(Continued)

OTHER PUBLICATIONS

English translation of JP2005338454 A. (Year: 2005).*

*Primary Examiner* — Richard Z Zhu
(74) *Attorney, Agent, or Firm* — Osha Bergman Watanabe & Burton LLP

(57) ABSTRACT

A voice analyzer analyzes whether a voice signal input into a voice input unit includes a specific characteristic component. A voice recognizer recognizes a voice represented by the voice signal input into the voice input unit. A response instruction unit instructs a response to a response operation unit that operates in response to the voice recognized by the voice recognizer. A controller controls the voice recognizer not to execute voice recognition processing by the voice recognizer or controls the response instruction unit not to instruct the response operation unit about an instruction content by the voice recognized by the voice recognizer, when the voice analyzer analyzes that the voice signal includes the specific characteristic component.

11 Claims, 12 Drawing Sheets

(51) Int. Cl.
    *G10L 25/81*     (2013.01)
    *G10L 25/84*     (2013.01)
    *G10L 15/22*     (2006.01)
    *G10L 25/93*     (2013.01)

(56) References Cited

U.S. PATENT DOCUMENTS

| | | | |
|---|---|---|---|
| 8,793,128 B2 * | 7/2014 | Miki | G10L 13/033 |
| | | | 704/226 |
| 9,792,902 B2 * | 10/2017 | Miyasaka | G10L 21/0208 |
| 10,325,591 B1 * | 6/2019 | Pogue | G10L 21/0208 |
| 2003/0018479 A1 * | 1/2003 | Oh | G10L 21/0272 |
| | | | 704/E19.009 |
| 2008/0300866 A1 * | 12/2008 | Mukhtar | G10L 21/038 |
| | | | 704/E21.001 |
| 2014/0003629 A1 | 1/2014 | Sonos | |
| 2015/0294666 A1 * | 10/2015 | Miyasaka | G10L 15/08 |
| | | | 704/251 |
| 2017/0357637 A1 | 12/2017 | Nell et al. | |
| 2018/0005627 A1 | 1/2018 | Miyasaka et al. | |
| 2019/0362719 A1 * | 11/2019 | Gruenstein | G10L 17/22 |
| 2020/0211549 A1 | 7/2020 | Yamagishi | |

FOREIGN PATENT DOCUMENTS

| | | |
|---|---|---|
| JP | H08-107375 A | 4/1996 |
| JP | 2003-044069 A | 2/2003 |
| JP | 2005-338454 A | 12/2005 |
| JP | 2015148648 A | 8/2015 |
| WO | 2014/103099 A1 | 7/2014 |
| WO | 2019/054199 A1 | 3/2019 |

* cited by examiner

VOICE RECOGNITION DEVICE, CONTROL METHOD OF VOICE RECOGNITION DEVICE, CONTENT REPRODUCING DEVICE, AND CONTENT TRANSMISSION/RECEPTION SYSTEM

TECHNICAL FIELD

The present disclosure relates to a voice recognition device, a control method of a voice recognition device, a content reproducing device, and a content transmission/reception system.

BACKGROUND ART

In recent years, a voice recognition device that recognizes a voice uttered by a person for executing a predetermined instruction and responds to the recognized instruction content has begun to spread. This type of voice recognition device is called a smart speaker.

CITATION LIST

Patent Literature

Patent Literature 1: Japanese Unexamined Patent Application Publication No. 8-107375

SUMMARY OF INVENTION

It has been reported that the voice recognition device erroneously responds to a voice such as television broadcasting or radio broadcasting instead of a voice uttered by a person. Therefore, it is required to prevent the voice recognition device from erroneously responding to a voice other than the voice uttered by a person. Patent Literature 1 describes that the voice emitted from a speaker is canceled by an echo canceller when a microphone collects a voice.

An object of the embodiments is to provide a voice recognition device, a control method of a voice recognition device, a content reproducing device, and a content transmission/reception system capable of preventing erroneous response to a voice other than a voice uttered by a person.

According to an aspect of the embodiments, a controller of a voice recognition device controls a voice recognizer not to execute voice recognition processing by the voice recognizer or controls a response instruction unit not to instruct the response operation unit about an instruction content by the voice recognized by the voice recognizer, when a specific characteristic component is superimposed on a voice signal.

Advantageous Effects

According to the voice recognition device, the control method of a voice recognition device, the content reproducing device, and the content transmission/reception system of the embodiments, it is possible to prevent erroneous response to the voice other than the voice uttered by a person.

DESCRIPTION OF EMBODIMENTS

Hereinafter, a voice recognition device, a control method of a voice recognition device, a content reproducing device, and a content transmission/reception system according to each of the embodiments will be described with reference to the accompaning drawings.

First Embodiment

Figure 1:
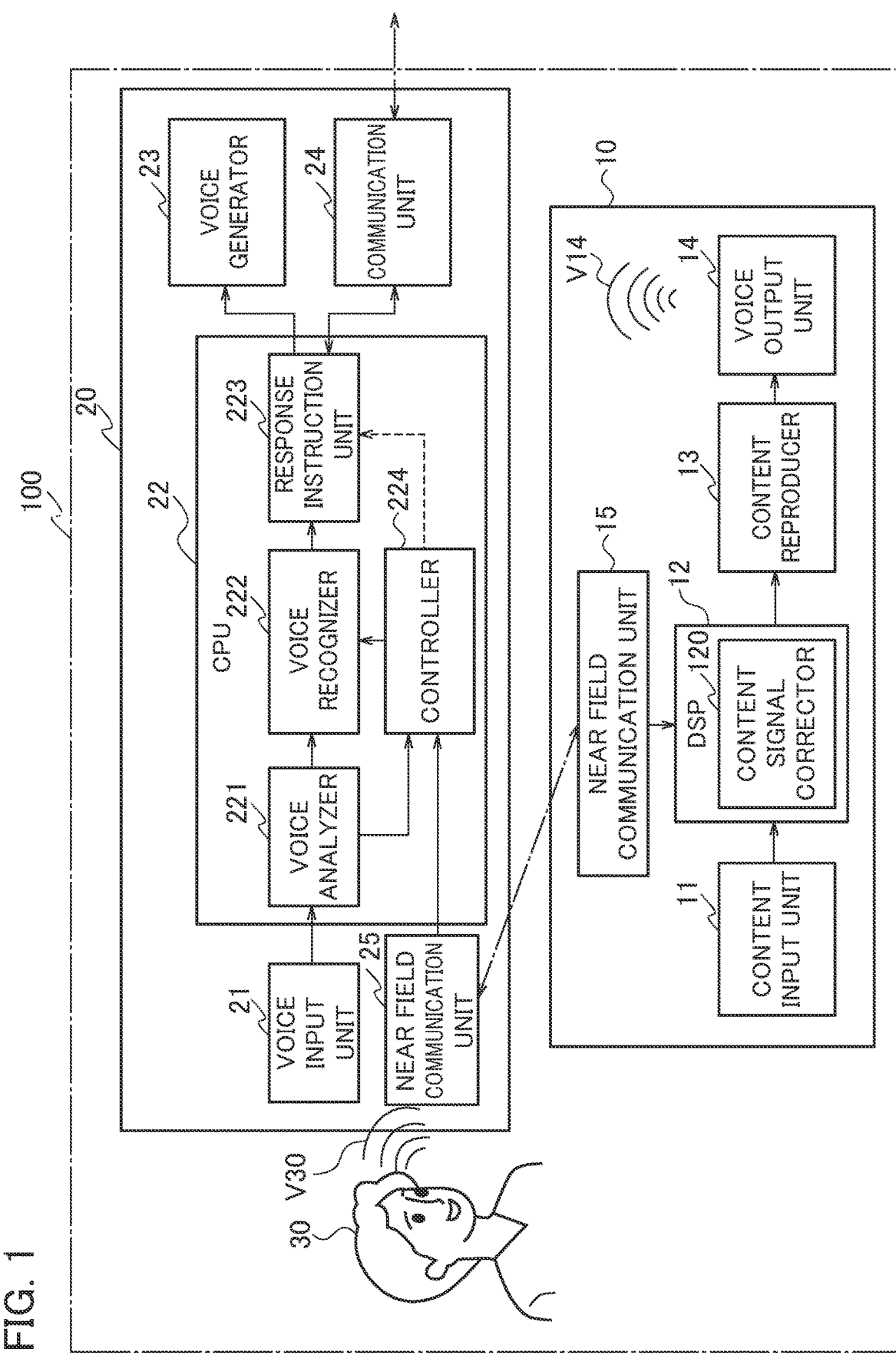
FIG. 1 is a block diagram illustrating a first embodiment.

In FIG. 1, a vehicle 100 includes an infotainment system 10 that reproduces a content such as music listened to by an occupant 30. The infotainment system 10 is an example of a content reproducing device or a content output device. In the vehicle 100, a voice recognition device 20 referred to as a smart speaker is disposed.

The infotainment system 10 includes a content input unit 11, a digital signal processor (hereinafter, DSP) 12, a content reproducer 13, a voice output unit 14, and a near field communication unit 15. The content input unit 11 is one of a television receiver that receives television broadcasting, a radio receiver that receives a radio broadcasting, and an internet receiver that receives internet broadcasting, for example. The content input unit 11 may be an optical disc reproducing device that reproduces a content recorded in an optical disc, or a memory reproducing device that reproduces a content stored in a semiconductor memory. The near field communication unit 15 is an example of a voice recognition device detection unit that detects the presence of the voice recognition device 20. The near field communication unit 15 is a wireless communication unit, for example, and may perform communication complying with a communication standard having a mechanism such as Bluetooth (registered trademark) that can specify communication connection partner equipment.

The content signal input from the content input unit 11 is input into the DSP 12. When the content signal is an analog signal, the content signal is converted into a digital signal by an unillustrated A/D converter and input into the DSP 12. The DSP 12 operates as the content signal corrector 120 by executing software (a computer program).

The content signal corrector 120 corrects the content signal when the near field communication unit 15 communicates with the voice recognition device 20 and recognizes the presence of the voice recognition device 20. The content signal to be corrected is a voice signal, and the content signal includes at least a voice signal. Here, it is assumed that the content signal is a voice signal.

The content signal corrector 120 corrects the content signal such that a specific characteristic component is superimposed on the content signal. How the content signal corrector 120 specifically corrects the content signal will be described in detail later. Note that the infotainment system 10 may be configured not to include the near field communication unit 15.

The content reproducer 13 includes a voice signal processing circuit and an amplifier, and reproduces the content signal supplied from the DSP 12. The voice output unit 14 is a speaker and outputs a voice V14 of the content signal.

The voice recognition device 20 includes a voice input unit 21, a central processing unit (hereinafter, CPU) 22, a voice generator 23, a communication unit 24, and a near field communication unit 25. The CPU 22 includes a voice analyzer 221, a voice recognizer 222, a response instruction unit 223, and a controller 224 as functional configurations.

The voice input unit 21 is a microphone, and when the occupant 30 utters a voice V30 to cause the voice recognition device 20 to execute a predetermined instruction, the voice input unit 21 collects the voice V30. The voice signal output from the voice input unit 21 is converted into a digital signal by an unillustrated A/D converter and is input into the CPU 22.

The voice V14 of the content signal reproduced by the infotainment system 10 may be input into the voice input unit 21. The voice analyzer 221 analyzes whether the characteristic component is superimposed on the voice signal output from the voice input unit 21. When the characteristic component is not superimposed on the voice signal, the voice input into the voice input unit 21 is the voice V30 uttered by the occupant 30. When the characteristic component is superimposed on the voice signal, the voice input into the voice input unit 21 is the voice V14 output from the infotainment system 10.

The analysis result of the voice analyzer 221 is supplied to the controller 224. The controller 224 controls the voice recognizer 222 to execute the voice recognition processing when it is analyzed that the characteristic component is not superimposed on the voice signal. The response instruction unit 223 instructs the voice generator 23 or the communication unit 24 about a response in response to the instruction content by the occupant 30 recognized by the voice recognizer 222. When the near field communication unit 25 does not recognize the presence of the infotainment system 10, the controller 224 may control the voice recognizer 222 to execute the voice recognition processing regardless of the analysis result of the voice analyzer 221.

When the near field communication unit 25 communicates with the infotainment system 10 to recognize the presence of the infotainment system 10 and it is analyzed that the characteristic component is superimposed on the voice signal, the controller 224 controls the voice recognizer 222 not to execute the voice recognition processing.

When the voice analyzer 221 analyzes that the characteristic component is superimposed on the voice signal, the voice signal input into the voice input unit 21 is not the voice V30 uttered by the occupant 30 but the voice V14 of the content signal. Since the voice recognizer 222 does not execute the voice recognition processing, even when the voice V14 includes a word that the voice recognition device 20 responds to, the word is not recognized. Accordingly, the response instruction unit 223 does not erroneously instruct a response to the voice generator 23 or the communication unit 24.

When the controller 224 analyzes that the characteristic component is superimposed on the voice signal, instead of controlling the voice recognizer 222 not to execute the voice recognition processing, the controller 224 may control the response instruction unit 223 not to respond to the instruction content supplied from the voice recognizer 222.

The near field communication unit 25 is an example of a reproducing device detection unit that detects the presence of the infotainment system 10 (content reproducing device). When the presence of the infotainment system 10 is detected by the near field communication unit 25, the voice analyzer 221 may analyze whether the voice signal input into the voice input unit 21 includes a specific characteristic component.

The voice recognition device 20 may include a reproducing device detection unit that detects that the infotainment system 10 (content reproducing device) reproduces a content. In this case, the near field communication unit 15 is configured to transmit the content reproduced by the content reproducer 13, and when the near field communication unit 25 receives the content, it is possible to detect that the infotainment system 10 can reproduce the content. When the reproducing device detection unit detects that the infotainment system 10 reproduces a content, the voice analyzer 221 may analyze whether the voice signal input into the voice input unit 21 includes a specific characteristic component.

The voice recognition device 20 may be configured not to include the near field communication unit 25. In this case, the controller 224 may control the voice recognizer 222 or the response instruction unit 223 based on only the analysis result of the voice analyzer 221.

The voice generator 23 and the communication unit 24 are examples of the response operation unit that operates in response to the voice recognized by the voice recognizer 222. The voice generator 23 generates a predetermined voice in response to the instruction content from the response instruction unit 223. The voice generator 23 includes a voice synthesizer and a speaker. The communication unit 24 communicates with an un illustrated external server or the like in response to the instruction content from the response instruction unit 223.

Figure 2:
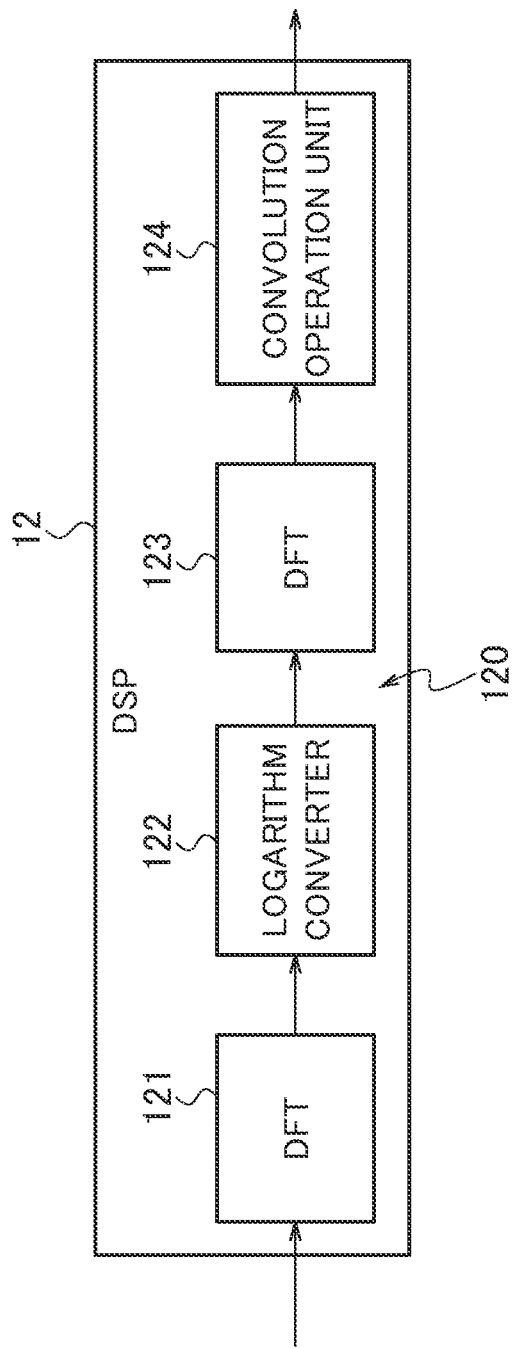
FIG. 2 is a block diagram illustrating a specific configuration example of a content signal corrector 120 illustrated in FIG. 1.

As illustrated in FIG. 2, the content signal corrector 120 includes a discrete Fourier transformer 121, a logarithm converter 122, a discrete Fourier transformer 123, and a convolution operation unit 124. Typically, the discrete Fourier transformers 121 and 123 perform Fourier transform with respect to the input signal by using fast Fourier transform (FFT), which is an algorithm that can calculate discrete Fourier transform (DFT) at high speed.

Figure 3:
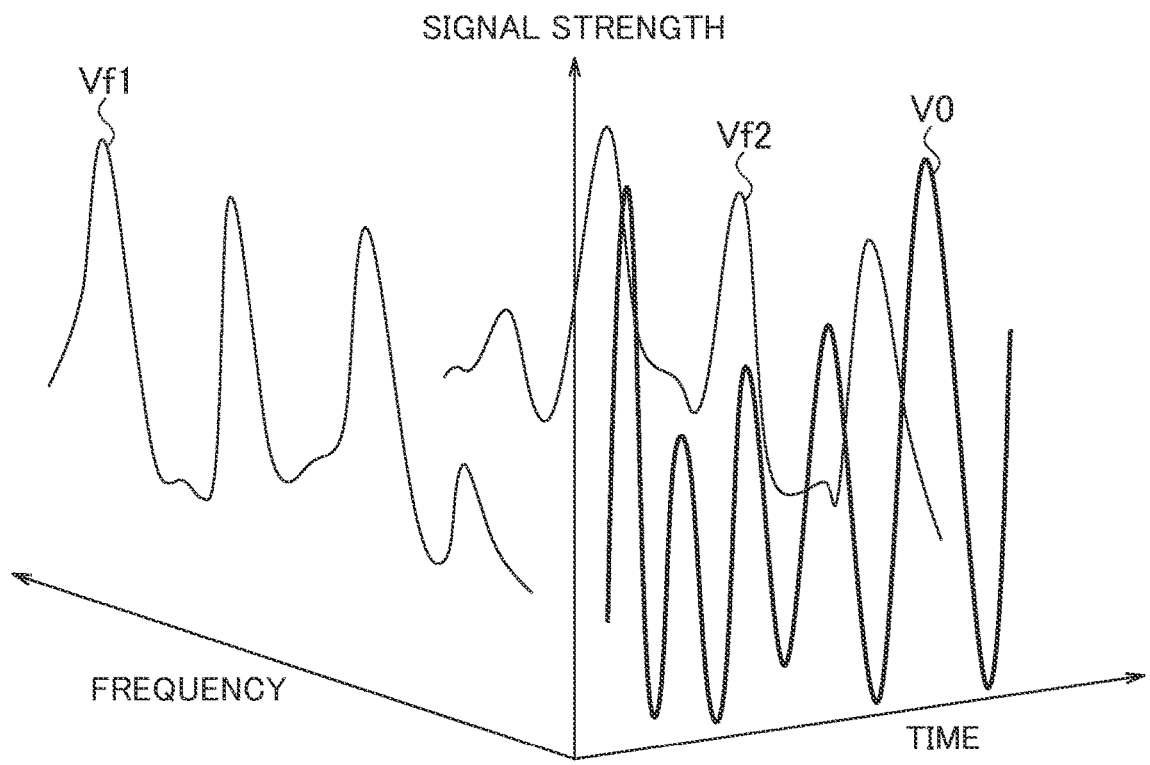
FIG. 3 is a waveform diagram conceptually illustrating a first converted signal obtained by performing discrete Fourier transform with respect to a voice waveform of a content signal.

The operation of the content signal corrector 120 will be described with reference to FIGS. 3 to 7. As illustrated in FIG. 3, it is assumed that the content signal input into the content signal corrector 120 has a voice waveform V0 of which the signal strength changes as time advances. When the discrete Fourier transformer 121 performs the discrete Fourier transform with respect to the voice waveform V0, a first converted signal having waveforms Vf1, Vf2, and the like represented by the frequency and the signal strength as illustrated in FIG. 3 is obtained. In FIG. 3, for simplification, only the waveforms Vf1 and Vf2 at two times are illustrated.

Figure 4:
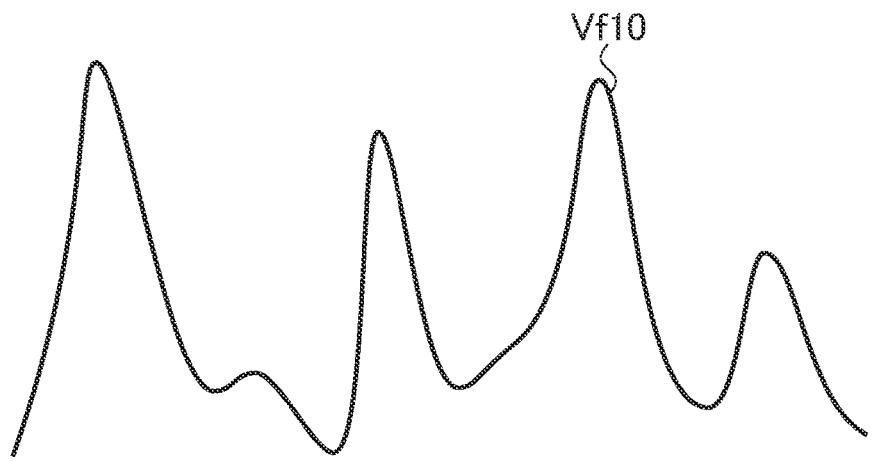
FIG. 4 is a waveform diagram conceptually illustrating a second converted signal obtained by performing logarithmic conversion and by further performing the discrete Fourier transform with respect to the first converted signal.

The logarithm converter 122 converts the first converted signal output from the discrete Fourier transformer 121 into a natural logarithm, and the discrete Fourier transformer 123 further performs the discrete Fourier transform with respect to the first converted signal converted into a logarithm. Then, the first converted signal at each time is converted into a second converted signal having only the spectrum envelope, with the signal strength component being removed, as illustrated in FIG. 4. FIG. 4 illustrates a waveform Vf10 that is a spectrum envelope that corresponds to the waveform Vf1.

The processing of obtaining the spectrum envelope by the discrete Fourier transformer 121, the logarithm converter 122, and the discrete Fourier transformer 123 is referred to as cepstrum analysis. The discrete Fourier transformer 121, the logarithm converter 122, and the discrete Fourier transformer 123 constitute a cepstrum analyzer that obtain the spectrum envelope of the voice signal.

Figure 5:
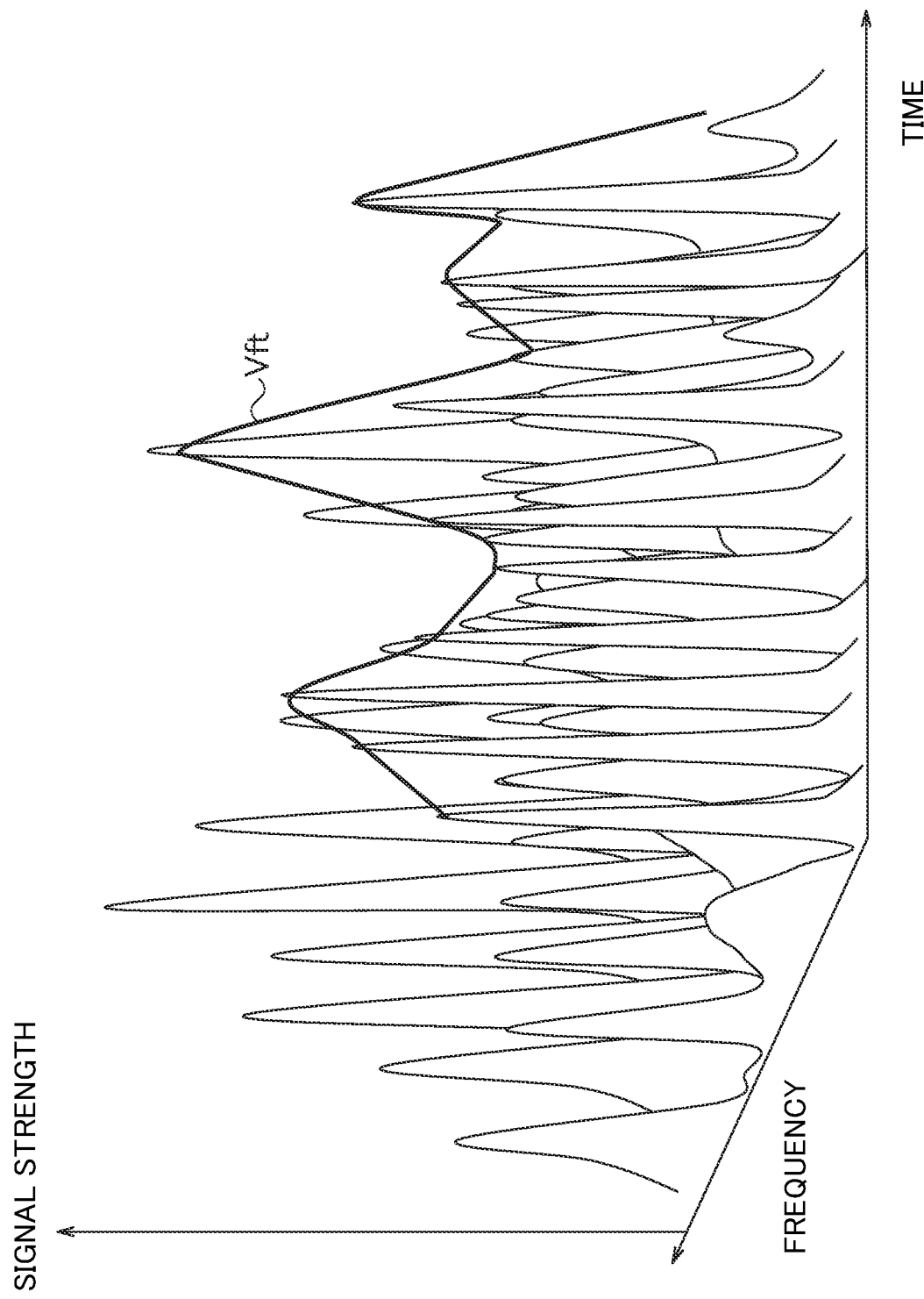
FIG. 5 is a waveform diagram conceptually illustrating an example of a waveform of the second converted signal at each time.

FIG. 5 illustrates an example of the waveform of the second converted signal output from the discrete Fourier transformer 123 at each time. A waveform Vft illustrated in FIG. 5 illustrates a change in the second converted signal at one certain frequency. In order to simplify the description of the convolution operation processing in the convolution operation unit 124, the convolution operation processing will be described using the waveform Vft at one frequency.

Figure 6:
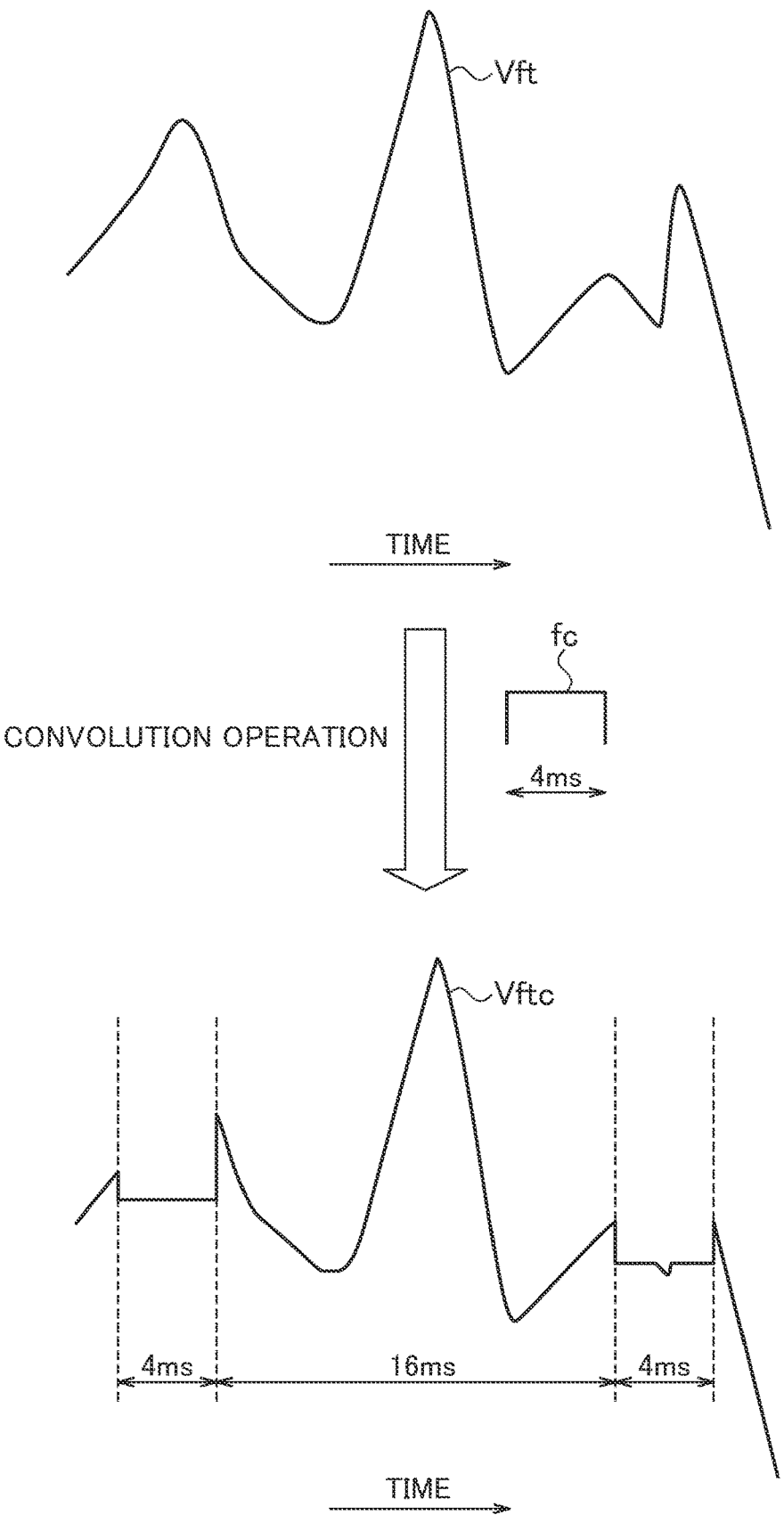
FIG. 6 is a waveform diagram conceptually illustrating convolution operation processing for a waveform of one frequency by a convolution operation unit 124 illustrated in FIG. 2.

As illustrated in FIG. 6, the convolution operation unit 124 executes a convolution operation to superimpose a predetermined convolution waveform fc on the waveform Vft. For example, the convolution operation unit 124 convolves the convolution waveform fc of 4 ms, for example, which is shorter than a predetermined value, on the waveform Vft not to affect the phonemes. In the example illustrated in FIG. 6, the convolution operation unit 124 convolves the convolution waveform fc of 4 ms every 16 ms, which is sufficiently longer than the predetermined value. Here, 16 ms is merely an example, and another value may be used.

The convolution operation executed by the convolution operation unit 124 may be any of multiplication, addition, and subtraction of the convolution waveform fc with respect to the waveform Vft. A waveform Vftc obtained by convolving the convolution waveform fc with the waveform Vft illustrated in FIG. 6 conceptually illustrates a state in which the convolution waveform fc is convoluted with the waveform Vft.

When the convolution waveform fc is convoluted with the waveform Vft as such, the waveform Vft becomes partially an artificial waveform in a state that cannot be found in nature. The characteristic component to be superimposed on the content signal is preferably an artificially incorporated waveform component that cannot be found in nature.

Figure 7:
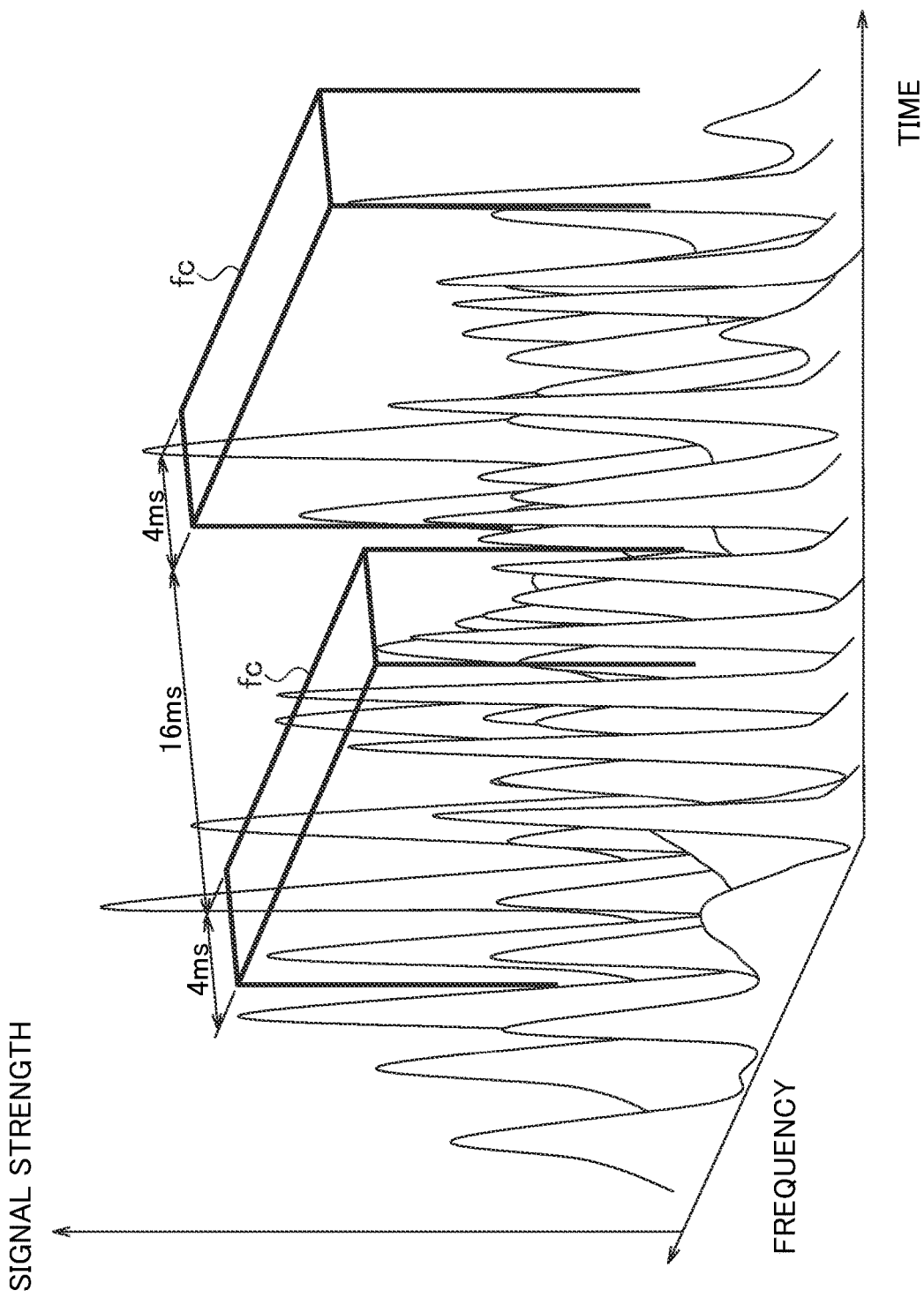
FIG. 7 is a waveform diagram conceptually illustrating convolution operation processing for all of the frequencies by the convolution operation unit 124 illustrated in FIG. 2.

FIG. 7 conceptually illustrates a state in which the convolution waveform fc is convolved with all of the frequencies of the second converted signal output from the discrete Fourier transformer 123. As illustrated in FIG. 7, the convolution operation unit 124 convolves the convolution waveform fc of 4 ms every 16 ms of the second converted signal. The convolution operation unit 124 may convolve the convolution waveform fc in a selected frequency band or may convolve the convolution waveform fc in the entire frequency band.

As such, the content signal corrector 120 superimposes a specific characteristic component on a part or the entirety of the frequency band of the voice signal at predetermined time intervals. The time for superimposing the characteristic component may be sufficiently shorter than the time for which a person recognizes the phonemes, and the interval for superimposing the characteristic component may be sufficiently longer than the time for a person to recognize the phonemes. The time intervals may not have to be equal to each other, but it is better to have equal intervals. When the characteristic components are superimposed at a predetermined time interval, it is difficult for a person to feel the voice signal unnaturally, and the analysis by the voice analyzer 221 becomes easy.

In FIG. 1, the voice V14 output from the voice output unit 14 is convoluted with the convolution waveform fc at predetermined time intervals as illustrated in FIGS. 6 and 7, and becomes a voice on which an artificial waveform component is superimposed as a characteristic component.

The voice analyzer 221 analyzes the voice signal output from the voice input unit 21, and when an artificial waveform component that cannot be found in nature is superimposed on the voice signal, the voice analyzer 221 analyzes that the voice signal is a voice V14 output from the infotainment system 10.

Incidentally, the voice recognizer 222 recognizes the voice input into the voice input unit 21 by using maximum likelihood estimation processing referred to as a hidden Markov model. As described above, the occupant 30 rarely feels unnatural even when listening to the voice V14 on which the above-described characteristic component is superimposed. However, when the voice recognizer 222 recognizes the voice V14, the voice V14 is not always correctly recognized, and there is a case where the voice V14 is not correctly recognized.

Accordingly, the controller 224 may control the voice recognizer 222 not to execute the voice recognition processing when the voice analyzer 221 analyzes that the characteristic component is superimposed on the voice signal. However, as described above, the voice recognizer 222 may execute the voice recognition processing, and the controller 224 may control the response instruction unit 223 not to respond to the instruction content represented by the recognized voice. In a case of controlling the response instruction unit 223 not to respond to the instruction content supplied from the voice recognizer 222, the controller 224 may control the response instruction unit 223 not to respond to only some words.

In FIG. 1, the voice analyzer 221, the voice recognizer 222, the response instruction unit 223, and the controller 224 are described as separate configurations, but at least the voice analysis function, the voice recognition function, and the response instruction function may be included, and the plural functions may be in one piece of hardware, or may be in plural pieces of hardware. The voice analysis function, the voice recognition function, and the response instruction function can be realized by a software program.

Figure 8:
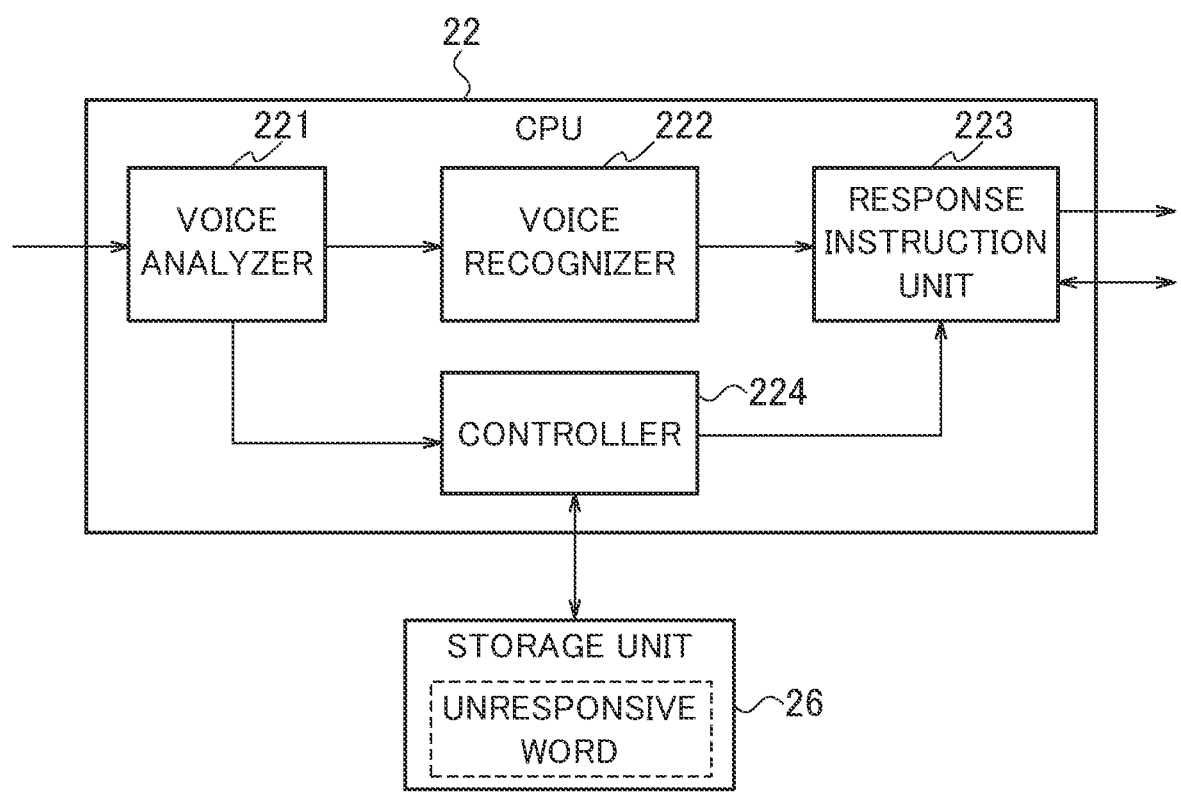
FIG. 8 is a block diagram illustrating a configuration example of a voice recognition device that does not allow a response to an instruction content including a specific word in a voice recognition device.

In a case of controlling the response instruction unit 223 not to respond to only some words, the controller 224 may be configured as illustrated in FIG. 8. As illustrated in FIG. 8, a storage unit 26, which stores unresponsive words, is connected to the CPU 22. The storage unit 26 can be configured with a non-volatile memory.

In the storage unit 26, words for allowing the communication units 24 to communicate with an external server and for performing instruction to a third party, such as "purchase", "order", "place order", and the like, are stored as unresponsive words. In order for the controller 224 to allow the response for the instruction content that does not incur a cost, and to disallow the response for the instruction content that incur a cost, only the words ("purchase", "order", and "place an order") related to the instruction content that is likely to incur a cost may be unresponsive words.

The controller 224 may simply allow the voice generator 23 to respond to the instruction content for generating a voice. In a case where the voice recognition device 20 is configured to make it possible to instruct the infotainment system 10 about the content to be reproduced, the controller 224 may allow a response to the instruction content for instructing the infotainment system 10 to reproduce the content.

Figure 9:
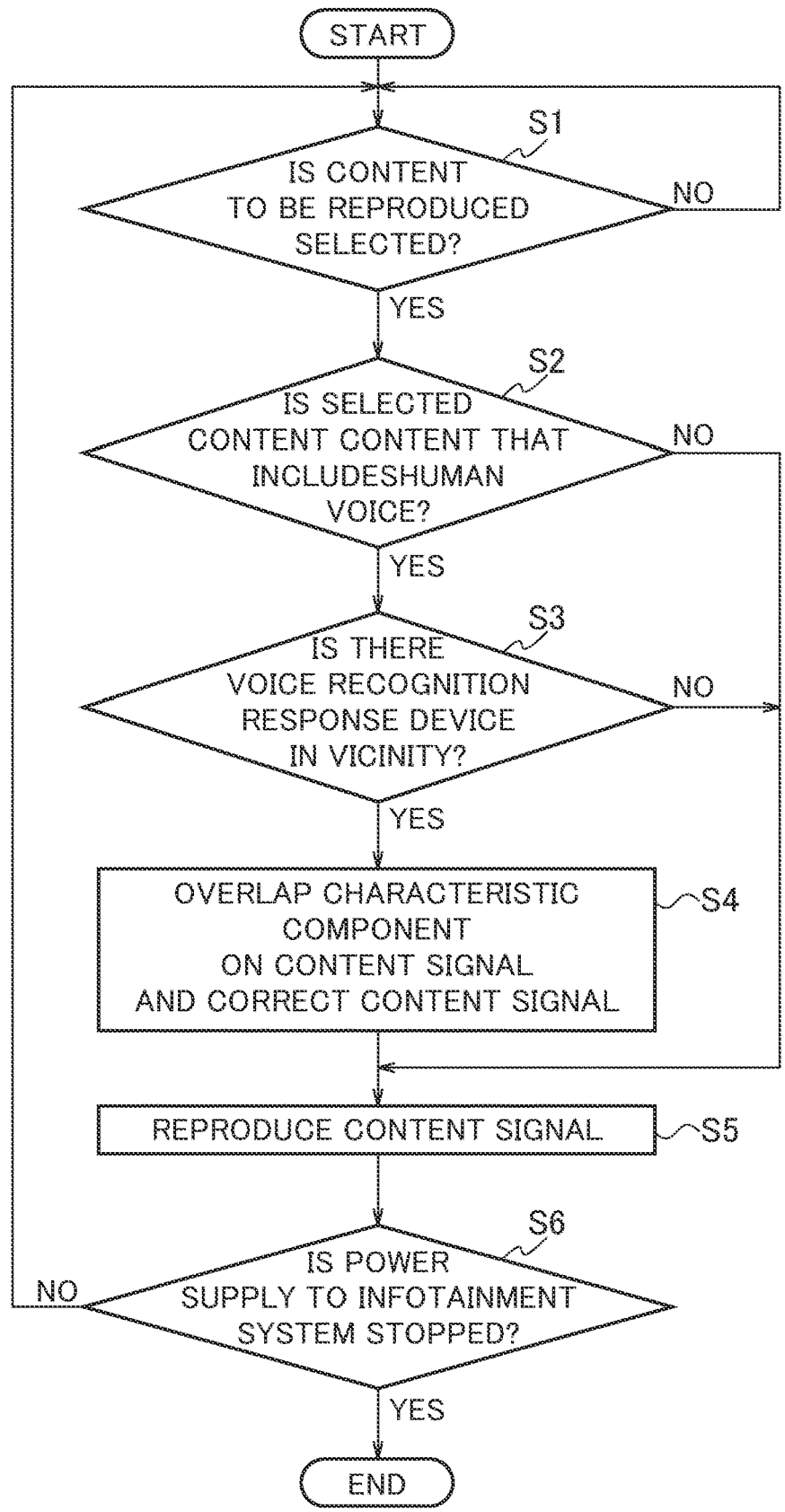
FIG. 9 is a flowchart illustrating processing executed by a content reproducing device.

The processing executed by the infotainment system 10 will be described with reference to the flowchart illustrated in FIG. 9. When the power of the vehicle 100 is turned on, the power is supplied to the infotainment system 10, and the infotainment system 10 starts operating. In step S1, the DSP 12 determines whether a content to be reproduced is selected. When a content is not selected (NO), the DSP 12 repeats the processing of step S1.

When a content is selected in step S1, in step S2, the DSP 12 determines whether the selected content is a content including a voice uttered by a human. The DSP 12 may determine that television broadcasting, radio broadcasting, and music recorded or stored in an optical disc or a semiconductor memory are contents that include a human voice. The DSP 12 may exclude the contents including only a video from the contents that is supposed to include a human voice. The DSP 12 may determine whether a human voice is included in a content by analyzing voice data of the content with a predetermined algorithm.

Here, it may be determined whether the content including a human voice actually includes a human voice, or whether the content including a human voice is the content having a possibility of including a human voice, for example, whether the content including a human voice is in a media that can include a human voice, such as an optical disc, television broadcasting, radio broadcasting, or the like, from the type of media.

When the content selected in step S2 is a content including a human voice (YES), the DSP 12. shifts the processing to step S3. When the selected content is not a content including a human voice (NO), the DSP 12 shifts the processing to step S5. In step S3, the DSP 12 determines whether there is the voice recognition device 20 in the vicinity. When there is the voice recognition device 20 in the vicinity (YES), the DSP 12 shifts the processing to step S4. When there is no voice recognition device 20 in the vicinity (NO), the DSP 12 shifts the processing to step S5. The processing of step S3 can be omitted.

In step S4, the DSP 12 superimposes the characteristic component on the content signal and corrects the content signal. In a case of shifting from step S4 to step S5, in step S5, the content reproducer 13 reproduces the content signal on which the characteristic component is superimposed. In a case of shifting from step S2 or S3 to step S5, in step S5, the content reproducer 13 reproduces the content signal on which the characteristic component is not superimposed.

In step S6, the DSP 12 determines whether the power supply to the infotainment system 10 is stopped due to the power-off of the vehicle 100. When the power supply to the infotainment system 10 is not stopped (NO), the DSP 12 repeats the processing of steps S1 to S6, and when the power supply is stopped (YES), the DSP 12 ends the processing.

The processing executed by the voice recognition device 20 will be described with reference to the flowchart illustrated in FIG. 10. When the power of the vehicle 100 is turned on, power is supplied to the voice recognition device 20, and the voice recognition device 20 starts operating. The voice recognition device 20 may be provided with a power switch, and the voice recognition device 20 may start operating when the power switch of the voice recognition device 20 is pressed.

Figure 10:
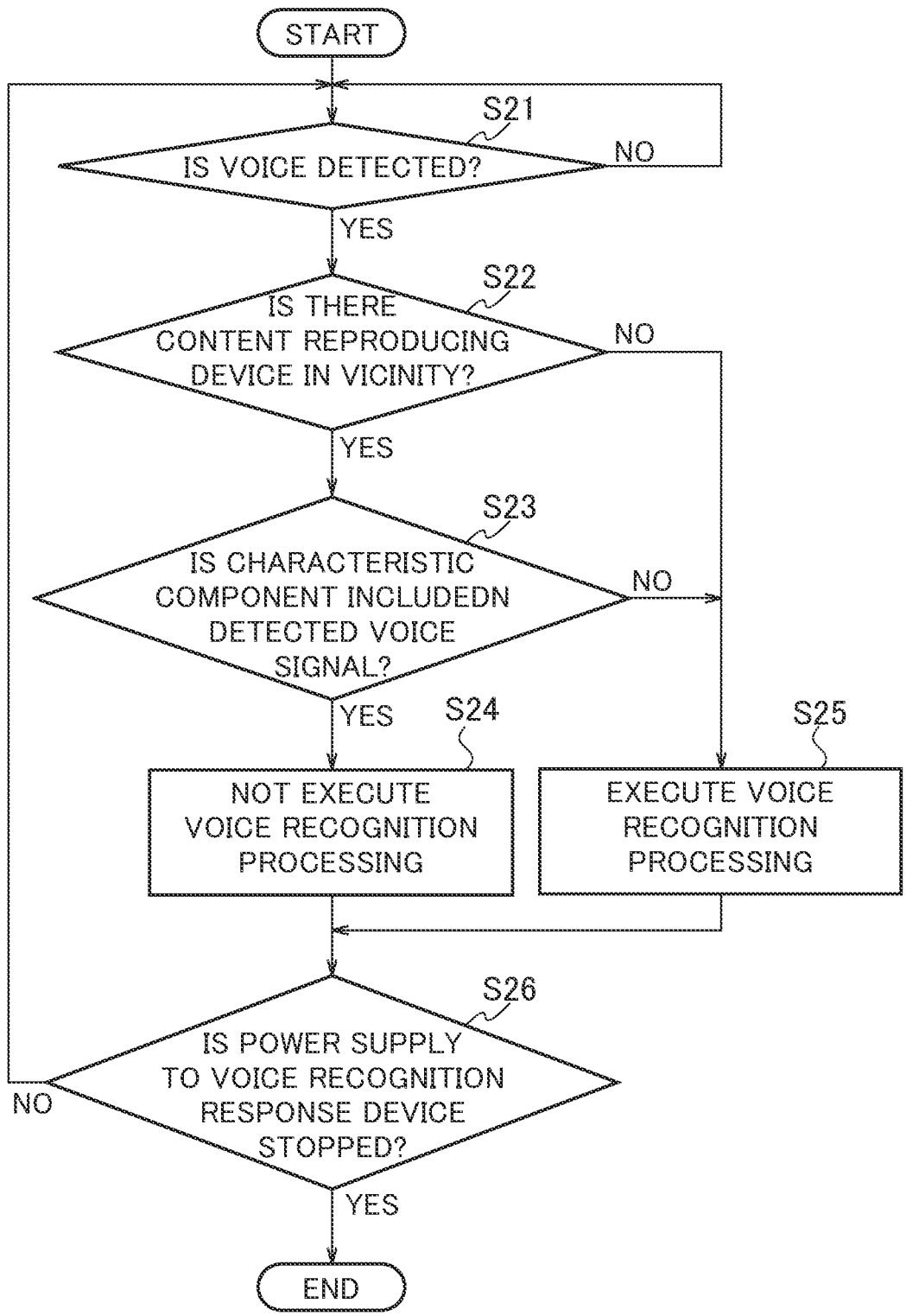
FIG. 10 is a flowchart illustrating processing executed by the voice recognition device and illustrating a control method of the voice recognition device.

In FIG. 10, the CPU 22 determines whether a voice is detected in step S21. In step S22, the CPU 22 determines whether there is the content reproducing device (infotainment system 10) in the vicinity. When there is the infotainment system 10 in the vicinity (YES), the CPU 22 shifts the processing to step S23. When there is no infotainment system 10 in the vicinity (NO), the CPU 22 shifts the processing to step S25. The processing of step S22 can be omitted.

In addition, in step S22, in a case where it is determined that there is the content reproducing device in the vicinity, it is further determined whether the content reproducing device is reproducing a content including a voice signal, and only in a case where the content reproducing device reproduces a content including a voice signal, the CPU 22 may shift the processing to step S23. In this case, the content reproducing device transmits data indicating that a content including a voice signal is being reproduced from the near field communication unit 15, the voice recognition device 20 receives the data by the near field communication unit 25, and accordingly, it is possible to determine that the content reproducing device is reproducing a content including a voice signal.

In step S23, the CPU 22 determines whether the detected voice signal includes the characteristic component. When the voice signal includes the characteristic component (YES), in step S24, the CPU 22 controls the voice recognizer 222 not to execute the voice recognition processing, and shifts the processing to step S26. When the voice signal does not include the characteristic component (NO), the CPU 22 shifts the processing to step S25. In step S25, the CPU 22 controls the voice recognizer 222 to execute the voice recognition processing, and shifts the processing to step S26.

Note that the processing in which the order of step S23 and step S24 is switched is also possible. In other words, after executing the voice recognition processing for all of the voice signals, it is determined whether the voice signal includes the characteristic component, and it is also possible not to execute the instruction content detected by the voice recognition processing for the voice signal including the characteristic component.

In FIG. 10, the illustration of the processing in which the response operation unit operates in response to the instruction content based on the recognized voice is omitted.

In step S26, the CPU 22 determines whether the power supply to the voice recognition device 20 is stopped by the power-off of vehicle 100 or the pressing of the power switch of the voice recognition device 20. When the power supply to the voice recognition device 20 is not stopped (NO), the CPU 22 repeats the processing of steps S21 to S26, and when the power supply is stopped (YES), the CPU 22 ends the processing.

In the first embodiment illustrated in FIG. 1, the infotainment system 10 and the voice recognition device 20 are arranged in the vehicle 100, but the infotainment system 10 and the voice recognition device 20 may be arranged in a house other than the vehicle 100, for example. The voice recognition device 20 can also be configured to be included in the infotainment system 10.

According to the first embodiment, the infotainment system 10 can superimpose the characteristic component on the reproduced content signal in order to distinguish the content signal from the voice uttered by a person. According to the first embodiment, it is possible to prevent the voice recognition device 20 from erroneously responding to a voice other than the voice uttered by a person.

Second Embodiment

Figure 11:
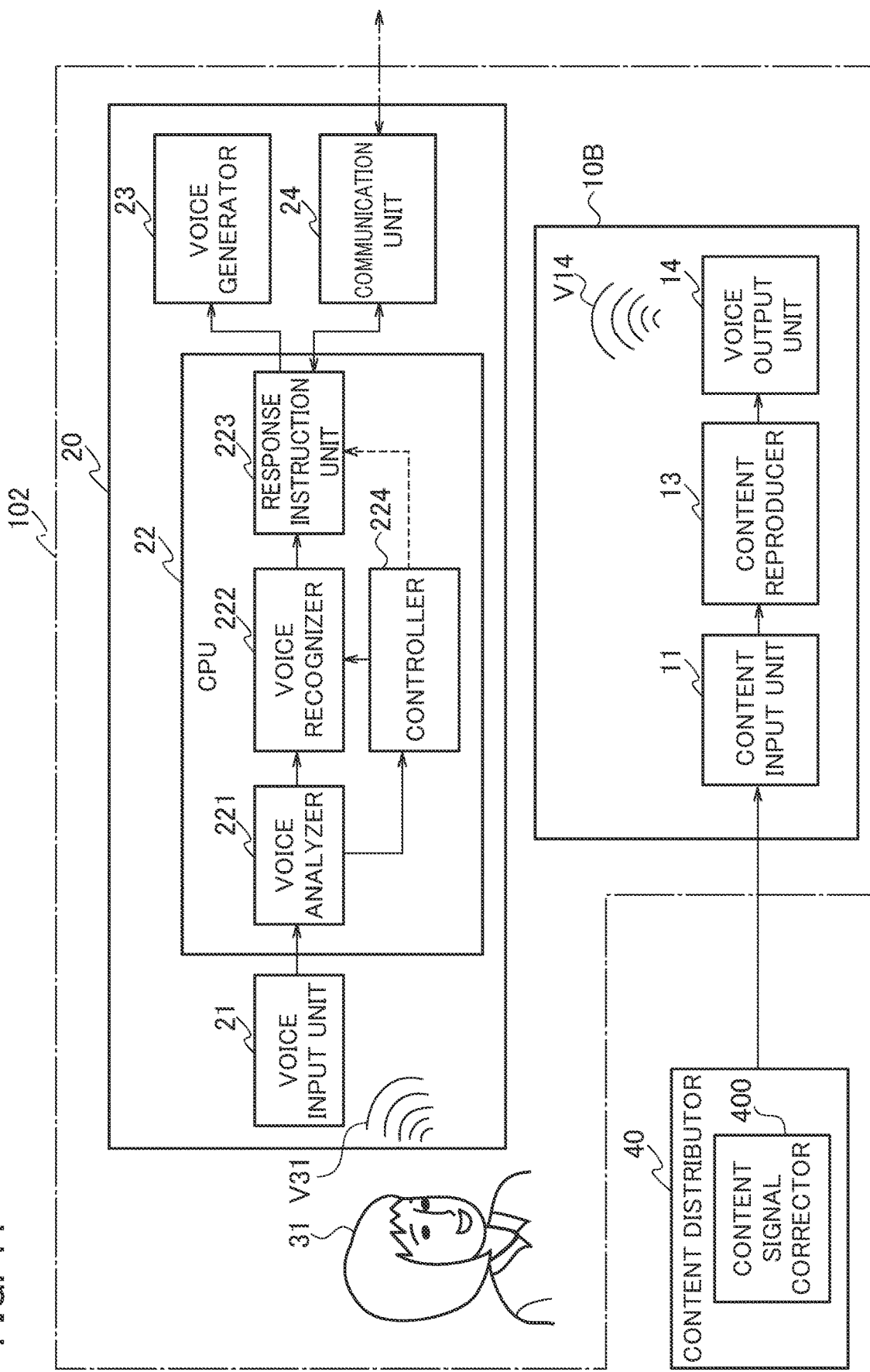
FIG. 11 is a block diagram illustrating a second embodiment.

In FIG. 11, the same parts as those in FIG. 1 will be given the same reference numerals and the description thereof will be omitted. In FIG. 11, a content reproducing device 10B and the voice recognition device 20 are arranged in a house 102. A content distributor 40 is a television broadcasting station, a radio broadcasting station, or a streaming server. The content distributor 40 is a transmitter that transmits a content signal. The content distributor 40 includes a content signal corrector 400, similar to the content signal corrector 120 illustrated in FIG. 1.

The content reproducing device 10B includes a content input unit 11, a content reproducer 13, and a voice output unit 14. The content reproducing device 10B is a receiver that receives the content signal distributed by the content distributor 40. The voice recognition device 20 has the same configuration as the voice recognition device 20 in FIG. 1.

Similar to the first embodiment, the content signal corrector 400 superimposes a characteristic component, which is an artificial waveform component that cannot be found in nature, on the content signal. The content input unit 11 of the content reproducing device 10B receives the content signal on which the characteristic component is superimposed. The voice output unit 14 of the content reproducing device 10B outputs the voice V14 on which the characteristic component is superimposed.

In a case where a voice V31 uttered by a user 31 is input into the voice input unit 21, the voice recognition device 20 executes the voice recognition processing and responds to the recognized instruction content. In a case where the voice V14 output from the content reproducing device 10B is input into the voice input unit 21, the voice recognition device 20 does not execute the voice recognition processing or does not respond to the instruction content even when the voice recognition processing is executed.

In FIG. 11, the content distributor 40 and the content reproducing device 10B include a content transmission/reception system including the transmitter that transmits the content signal corrected to superimpose a specific characteristic component on the voice signal and the receiver that receives the content signal.

In the second embodiment illustrated in FIG. 11, the content reproducing device 10B and the voice recognition device 20 are arranged in the house 102, but the content reproducing device 10B and the voice recognition device 20 may be arranged in the vehicle.

According to the second embodiment, since the content distributor 40 transmits the content signal on which the characteristic component is superimposed, the content reproducing device 10B does not need to include the content signal corrector 120. According to the second embodiment, it is possible to prevent the voice recognition device 20 from erroneously responding to a voice other than the voice uttered by a person.

Third Embodiment

Figure 12:
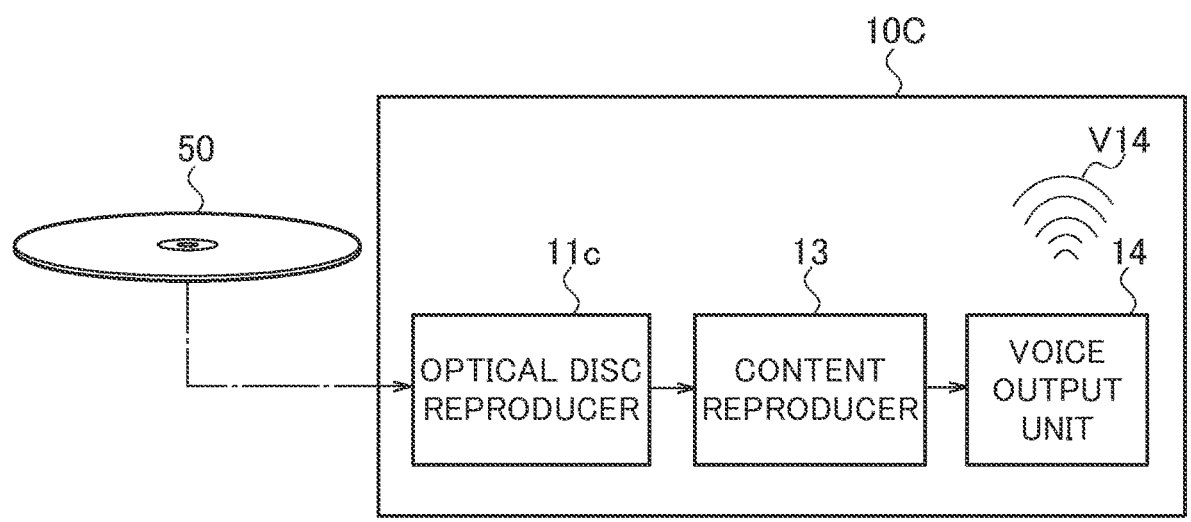
FIG. 12 is a block diagram illustrating a third embodiment.

In FIG. 12, the same parts as those in FIG. 1 or 11 will be given the same reference numerals and the description thereof will be omitted. A content reproducing device 10C includes an optical disc reproducer 11c, the content reproducer 13, and the voice output unit 14. The optical disc reproducer 11c corresponds to the content input unit. The content reproducing device 10C is disposed in the vehicle 100 similar to FIG. 1 or in the house 102 similar to FIG. 11. In FIG. 12, the voice recognition device 20 is not illustrated.

In FIG. 12, the content reproducing device 10C exemplifies reproducing of an optical disc medium, but the content reproducing device is not limited thereto. The content reproducing device 10C may be a content reproducing device that reproduces a content stored in a storage medium other than the optical disc medium such as a semiconductor memory storage medium or a magnetic tape storage medium, or may be a content reproducing device that includes a receiver and reproduces a content including a voice signal, transmitted via a wired or wireless network.

An optical disc 50 such as a Blu-ray disc (BD), a DVD, or a compact disc (CD) records a content signal on which a characteristic component is superimposed. The optical disc reproducer 11c reproduces the optical disc 50.

In a third embodiment, in a case where the voice V30 uttered by the occupant 30 or the voice V31 uttered by the user 31 is input into the voice input unit 21, the voice recognition device 20 executes the voice recognition processing and responds to the recognized instruction content. In a case where the voice V14 which is a reproduced voice of the optical disc 50 output from the content reproducing device 10C is input into the voice input unit 21, the voice recognition device 20 does not execute the voice recognition processing or does not respond to the instruction content even when the voice recognition processing is executed.

According to the third embodiment, since the content signal on which the characteristic component is superimposed is recorded in advance in the optical disc 50, the content reproducing device 10C does not need to include the content signal corrector 120. According to the third embodiment, it is possible to prevent the voice recognition device 20 from erroneously responding to a voice other than the voice uttered by a person.

Fourth Embodiment

Figure 13:
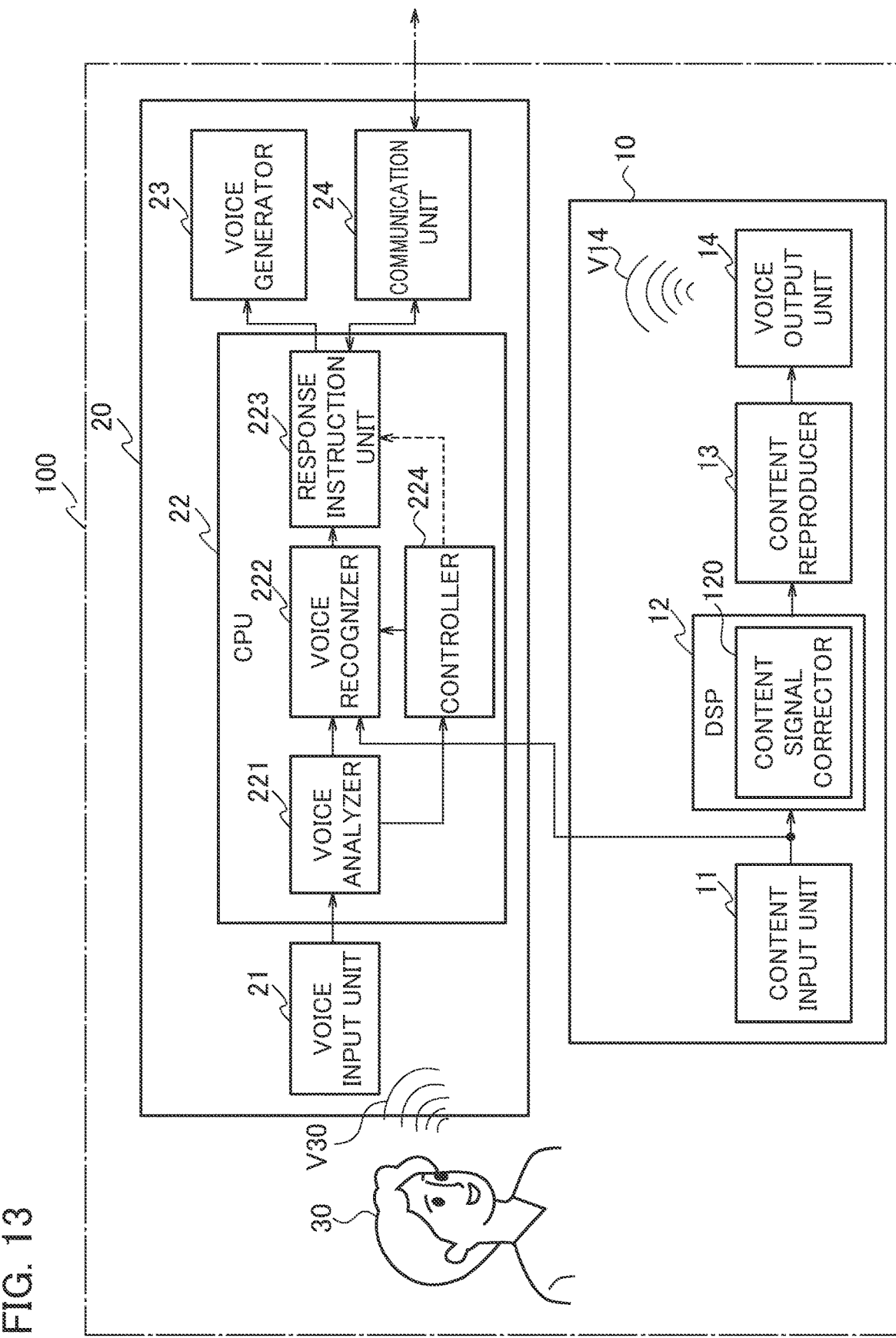
FIG. 13 is a block diagram illustrating a fourth embodiment.

In the first embodiment illustrated in FIG. 1, the voice V30 uttered by the occupant 30 and the voice V14 output from the infotainment system 10 may be mixed and input into the voice input unit 21. In the fourth embodiment illustrated in FIG. 13, the voice recognizer 222 is supplied with the content signal input from the content input unit 11. The voice recognizer 222 recognizes the voice by excluding the content signal from the voice signal obtained by the voice input unit 21 collecting the voice V30.

According to the fourth embodiment, even in a case where the voice V30 and the voice V14 are mixed and input into the voice input unit 21, the voice V30 can be correctly recognized. Instead of supplying the content signal to the voice recognizer 222, a flag indicating that the content signal (or the voice V14) reproduced by the infotainment system 10 is present may be supplied to the voice recognizer 222.

In the second embodiment illustrated in FIG. 11 and the third embodiment illustrated in FIG. 12, the content signal may be supplied to the voice recognizer 222 or the flag may be supplied to the voice recognizer 222.

In the fourth embodiment, the technology of the echo canceller described in Patent Literature 1 may be adopted, and the voice V14 may be canceled by the echo canceller when the voice V30 is input into the voice input unit 21.

The present invention is not limited to the above-described first to fourth embodiments, and various modifications can be made without departing from the scope of the present invention. The content signal corrector 120 may be configured with a processor such as a CPU other than the DSP 12, or may be configured with a circuit by hardware. Choice of the hardware and the software is arbitrary. The processor may operate as the content signal corrector 120 by executing the computer program stored in the non-transitory storage medium.

In the first to fourth embodiments, the voice analyzer 221, the voice recognizer 222, the response instruction unit 223, and the controller 224 are realized as functional configurations by the CPU 22, but at least a part of these may be configured with a circuit by hardware, and choice of the hardware and the software is arbitrary. The processor may operate as the voice analyzer 221, the voice recognizer 222, the response instruction unit 223, and the controller 224 by executing the computer program stored in the non-transitory storage medium.

In addition to distinguishing the voice V14 and the voice V30 (or V31) by the presence of the characteristic component, the voice V14 and the voice V30 (or V31) may be distinguished by another distinguishing method. As another distinguishing method, both the voice V14 and the voice V30 (or V31) may be distinguished based on the difference between the direction in which the voice V14 comes into the voice input unit 21 and the direction in which the voice V30 (or V31) comes into the voice input unit 21. When the voice input unit 21 is a stereo microphone or two or more monaural microphones, it is possible to identify the direction in which the voice comes in. As another distinguishing method, the difference between the continuous waveform part and the discontinuous waveform part may be identified.

In the first to fourth embodiments, the content signal corrector 120 is included in the infotainment system 10. However, the content signal corrector 120 may be provided in a content distribution server that communicates with vehicle 100 and distributes a content to the vehicle 100. In this case, for example, in the content distribution server, the content signal corrector 120 superimposes a specific characteristic component on the voice signal of the content with respect to the content including a human voice, and the content is distributed to the vehicle. The content distribution server may be a television broadcasting server, a radio broadcasting server, or the like.

REFERENCE SIGNS LIST

10: infotainment system
10B, 10C: content reproducing device
11: content input unit
11c: optical disc reproducer
12: digital signal processor
13: content reproducer
14: voice output unit
15, 25: near field communication unit
20: voice recognition device
21: voice input unit
22: central processing unit
23: voice generator
24: communication unit
26: storage unit
30: occupant
31: user
40: content distributor
50: optical disc
120, 400: content signal corrector
121, 123: discrete Fourier transformer
122: logarithm converter
124: convolution operation unit
221: voice analyzer
222: voice recognizer
223: response instruction unit
224: controller
V14, V30, V31: voice

The invention claimed is:

1. A voice recognition device comprising:
a voice input unit into which a voice signal is input;
a voice analyzer configured to analyze whether a specific characteristic component is included in the voice signal input into the voice input unit;
a voice recognizer configured to recognize a voice represented by the voice signal input into the voice input unit;
a response instruction unit configured to instruct a response to a response operation unit that operates in response to the voice recognized by the voice recognizer;
a controller configured to control the voice recognizer not to execute voice recognition processing by the voice recognizer or to control the response instruction unit not to instruct the response operation unit about an instruction content by the voice recognized by the voice recognizer, when the voice analyzer analyzes that the voice signal includes the specific characteristic component; and
a reproducing device detection unit configured to detect presence of a content reproducing device including a voice output unit,
wherein the voice analyzer analyzes whether the voice signal input into the voice input unit includes the specific characteristic component when the reproducing device detection unit detects the presence of the content reproducing device, and
wherein the specific characteristic component is an artificial waveform component superimposed on the voice signal by a content signal corrector at a predetermined time interval.

2. The voice recognition device according to claim 1, wherein the voice signal is a voice signal included in a content of television broadcasting, radio broadcasting, or internet broadcasting.

3. A control method of a voice recognition device by a processor comprising:
detecting whether a content reproducing device including a voice output unit reproduces a content;
analyzing whether a specific characteristic component is included in a voice signal input into a voice input unit when it is detected that the content reproducing device reproduces a content;
recognizing a voice by executing voice recognition processing of the voice represented by the voice signal input into the voice input unit when it is detected that the voice signal does not include the specific characteristic component;

instructing a response to a response operation unit that operates in response to a recognized voice; and performing control not to execute the voice recognition processing of the voice represented by the voice signal input into the voice input unit or perform control not to instruct the response operation unit about an instruction content by the voice recognized by executing the voice recognition processing, when it is analyzed that the voice signal includes the specific characteristic component, wherein the specific characteristic component is an artificial waveform component superimposed on the voice signal by a content signal corrector at a predetermined time interval.

4. A content reproducing device comprising:
   a content input unit configured to input a content signal including at least a voice signal;
   a content reproducer configured to reproduce the content signal;
   a voice output unit configured to output a voice of the content signal;
   a voice recognition device detection unit configured to detect presence of a voice recognition device; and
   a content signal corrector configured to correct the voice signal such that the voice signal includes a specific characteristic component, in order for a voice recognition device to distinguish the voice output by the voice output unit from a voice uttered by a person, when the voice recognition device detection unit detects the presence of the voice recognition device,
   wherein the specific characteristic component is an artificial waveform component superimposed on the voice signal by the content signal corrector at a predetermined time interval.

5. The content reproducing device according to claim 4, wherein the content signal corrector is a processor which obtains a spectrum envelope of a frequency of the voice signal, and convolves an artificial waveform component as the specific characteristic component in the spectrum envelope at a predetermined time interval.

6. A content transmission and reception system comprising:
   a content output device configured to output at least a voice of a content signal including a voice signal corrected such that a specific characteristic component is included in the voice signal uttered by a person; and
   a voice recognition device configured to perform control not to execute voice recognition processing by a voice recognizer or to perform control not to respond to an instruction content by a recognized voice, when it is analyzed whether an input voice signal includes the specific characteristic component and analyzed that the input voice signal includes the specific characteristic component, in a case where it is detected that the content output device is outputting the voice of the content signal,
   wherein the specific characteristic component is an artificial waveform component superimposed on the voice signal by a content signal corrector at a predetermined time interval.

7. A content transmission and reception system comprising:
   a voice recognition device configured to perform control not to execute voice recognition processing by a voice recognition unit or to perform control to not respond to an instruction content by a recognized voice, when it is analyzed whether an input voice signal includes a specific characteristic component and analyzed that the input voice signal includes the specific characteristic component; and
   a content output device configured to output a content signal including a corrected voice signal by performing correction such that the specific characteristic component is included in the voice signal included in the content signal, when outputting the content signal including the voice signal uttered by a person, in a case where presence of the voice recognition device is detected,
   wherein the specific characteristic component is an artificial waveform component superimposed on the voice signal by a content signal corrector at a predetermined time interval.

8. A voice recognition device comprising:
   a voice input unit into which a voice signal is input;
   a voice analyzer configured to analyze whether a specific characteristic component is included in the voice signal input into the voice input unit;
   a voice recognizer configured to recognize a voice represented by the voice signal input into the voice input unit;
   a response instruction unit configured to instruct a response to a response operation unit that operates in response to the voice recognized by the voice recognizer;
   a controller configured to control the voice recognizer not to execute voice recognition processing by the voice recognizer or to control the response instruction unit not to instruct the response operation unit about an instruction content by the voice recognized by the voice recognizer, when the voice analyzer analyzes that the voice signal includes the specific characteristic component; and
   a reproducing device detection unit configured to detect that a content reproducing device including a voice output unit reproduces a content,
   wherein the voice analyzer analyzes whether the voice signal input into the voice input unit includes the specific characteristic component when the reproducing device detection unit detects that the content reproducing device reproduces a content, and
   wherein the specific characteristic component is an artificial waveform component superimposed on the voice signal by a content signal corrector at a predetermined time interval.

9. The voice recognition device according to claim 8, wherein the voice signal is a voice signal included in a content of television broadcasting, radio broadcasting, or internet broadcasting.

10. A control method of a voice recognition device by a processor comprising:
    detecting whether a content reproducing device including a voice output unit is present;
    analyzing whether a specific characteristic component is included in a voice signal input into a voice input unit when presence of the content reproducing device is detected;
    recognizing a voice by executing voice recognition processing of the voice represented by the voice signal input into the voice input unit when it is detected that the voice signal does not include the specific characteristic component;
    instructing a response to a response operation unit that operates in response to a recognized voice; and performing control not to execute the voice recognition processing of the voice represented by the voice signal input into the voice input unit or perform control not to instruct the response operation unit about an instruction content by the voice recognized by executing the voice recognition processing, when it is analyzed that the voice signal includes the specific characteristic component, wherein the specific characteristic component is an artificial waveform component superimposed on the voice signal by a content signal corrector at a predetermined time interval.

11. A content transmission and reception system comprising:

a content output device configured to output at least a voice of a content signal including a voice signal corrected such that a specific characteristic component is included in the voice signal uttered by a person; and a voice recognition device configured to perform control not to execute voice recognition processing by a voice recognition unit or to perform control not to respond to an instruction content by a recognized voice, when it is analyzed whether an input voice signal includes the specific characteristic component and analyzed that the input voice signal includes the specific characteristic component, in a case where presence of the content output device is detected, wherein the specific characteristic component is an artificial waveform component superimposed on the voice signal by a content signal corrector at a predetermined time interval.

* * * * *